United States Patent [19]

West

[11] Patent Number: 4,755,563

[45] Date of Patent: Jul. 5, 1988

[54] BLOCK COPOLYMER DISPERSANTS CONTAINING IONIC MOIETIES

[75] Inventor: Michael W. J. West, Wilmington, Del.

[73] Assignee: E. I. Du Pont de Nemours and Company, Wilmington, Del.

[21] Appl. No.: 947,319

[22] Filed: Dec. 29, 1986

[51] Int. Cl.$^4$ .......................................... C08F 293/00
[52] U.S. Cl. ..................................... 525/287; 525/291; 525/294; 525/359.6; 524/535
[58] Field of Search ........................ 525/287, 291, 294

[56] References Cited

U.S. PATENT DOCUMENTS

| | | | |
|---|---|---|---|
| 3,281,500 | 10/1966 | Bauer | 525/287 |
| 3,287,298 | 11/1966 | D'Alelio | 525/291 |
| 3,912,677 | 10/1975 | Baker et al. | 106/308 R |
| 4,508,880 | 4/1985 | Webster | 526/190 |
| 4,668,742 | 5/1987 | Huynh-Ba et al. | 525/294 |

*Primary Examiner*—Wilbert J. Briggs, Sr.
*Attorney, Agent, or Firm*—Donald W. Huntley

[57] ABSTRACT

Block copolymers composed of similar monomers, but which exhibit subtantially different polarity, one of the blocks having cationic ammonium, phosphonium, or sulfonium moieties. The block copolymers, which are preferably prepared by group transfer polymerization techniques provide excellent performance as pigment dispersants, without the need for special salt-forming components.

12 Claims, No Drawings

BLOCK COPOLYMER DISPERSANTS CONTAINING IONIC MOIETIES

BACKGROUND OF THE INVENTION

Polymeric materials have previously been known which are effective for dispersing pigments in organic solvents. Such polymeric dispersants are typically of the AB or BAB types, in which a polar group known as the A segment is present in the molecule to facilitate attachment to a pigment surface, and at least one nonpolar portion known as the B segment is present to enhance stearic stabilization of the pigment particles in a dispersion.

Baker et al, in U.S. Pat. No. 3,912,677, disclose the benefits of polymers containing ionic groups, in specific cases where the ionic groups are in the form of a salt with a salt-forming component or counterion. The salt-forming component has an affinity for the surface of organic pigment particles, and is capable of reaction with the polar-bound ionic group so as to form a salt. However, continued effort has been directed to improve the performance of polymeric dispersants, and to find effective dispersants that do not require the use of special salt-forming components, the use of which complicates the manufacture of the dispersants, and can introduce undesirable color.

SUMMARY OF THE INVENTION

The present invention is based on the discovery that block copolymers composed of similar monomers, but which exhibit substantially different ionic character, one of the blocks having cationic ammonium, phosphonium, or sulfonium moieties, provide excellent performance as pigment dispersants, without the need for special salt-forming components.

Specifically, the instant invention provides a block copolymer consisting essentially of (a) about from 0.1 to 50%, by weight of the copolymer, of at least one block having a number average molecular weight of about from 200 to 10,000 and prepared from at least one monomer selected from compounds of the general formulas $CH_2=CHCO_2R$ and $CH_2=CCH_3CO_2R$, wherein R is alkyl or alkyl ether of 1-20 carbon atoms, the block further containing at least 2 pendant ionic moieties of the general formula $-A(R_1)_mX$, wherein A is selected from N, P, and S; $R_1$ are independently selected from alkyl or alkyl ether of 1-20 carbon atoms, phenyl or substituted phenyl, m is 3 when A is N or P, and m is 2 when A is S, and X is selected from halides and conjugate bases of organic acids, the backbone of the block being composed of ethylenically unsaturated units, and (b) about from 99.9 to 50%, by weight of the copolymer, of at least one block having a number average molecular weight of about from 500 to 100,000 and prepared from monomers selected from compounds of the general formulas $CH_2=CHCO_2R$ and $CH_2=CCH_3CO_2R$, wherein R is alkyl or alkyl ether of 1-20 carbon atoms.

These compounds can be, and preferably are, prepared by group transfer polymerization techniques, exhibit excellent performance as dispersants and do not require salt-forming counterions for satisfactory performance.

DETAILED DESCRIPTION OF THE INVENTION

Monomers which can be used in the preparation of the dispersants of the present invention include those acrylates and methacrylates described in Webster, U.S. Pat. No. 4,508,880 at column 8, lines 4 to 58, with the exception of 3-methacryl-oxypropyl acrylate; and 2-methacryloxyethyl acrylate and linalate. Monomers which are preferred for the first block of the copolymer, containing the pendant ionic groups, include dimethyl aminoethyl methacrylate and diethyl aminoethyl methacrylate. Monomers which are preferred for the second (b) block of the copolymers include methyl methacrylate, butyl methacrylate and 2-ethylhexyl methacrylate.

The polymers of the present invention can be prepared by conventional anionic polymerization techniques, in which a first block of the copolymer is formed, and, upon completion of the first block, a second monomer stream is started to form a subsequent block of the polymer. However, the reaction temperatures using such techniques should be maintained at a low level, for example, 0 to −40 degrees Centigrade, so that side reactions are minimized and the desired blocks, of the specified molecular weights, are obtained.

To attain the desired molecular weight of each block as well as uniformity in the blocks, Group Transfer Polymerization techniques are advantageously, and preferably, used, such as those described in the aforementioned Webster, U.S. Pat. No. 4,508,880, hereby incorporated by reference. In accordance with that process, an unsaturated monomer is contacted with an initiator and a catalyst system containing silicon, tin or germanium, under which the polymerization proceeds in a controlled manner, as opposed the random manner typical of polymerization reactions, so that a substantially linear polymer can be prepared having polymer chains which are uniform and of the desired molecular weight.

In the preparation of dispersants of the present invention, the order in which the blocks are prepared is not critical. Either the block containing the pendant ionic moieties or the block not containing these moieties can be prepared first.

Catalysts which can be used include those disclosed in U.S. Pat. No. 4,508,880 at column 11, lines 42 to 68, as well as those described in the copending, coassigned patent application of Dicker et al., U.S. Ser. No. 707,190, filed Mar. 1, 1985, hereby incorporated by reference.

Initiators which can be used include those indicated in the aforementioned Webster patent at Column 9, line 25 to Column 10 line 13. Preferred initiators include 1-(2-trimethyl-siloxyethoxy)-1-trimethylsiloxy-2-methylpropene; 1-(2-[1-ethoxyethoxy]ethoxy-1-trimethylsiloxy-2-methylpropene; and 1-methoxy-1-trimethylsiloxy-2-methylpropene.

If the dispersant is prepared by first forming the block without the pendant ionic groups, then these blocks are reacted, using the same general procedures, to form the blocks containing the pendant ionic groups. The same general reactants are used for these second blocks, except that the monomers and their relative quantities are selected to have an average of at least two cationic units, or their precursors, in each block. The cationic units can be in the required quaternary or tertiary configuration as polymerized, or, more typically and preferably, can be primary, secondary or tertiary amine, phosphine or thioether compounds which are converted to the quaternary or tertiary state after the formation of the basic polymer structure. While a wide variety of monomers can be so used, methacrylates have been found to be particularly satisfactory, including, for example, 2-(dimethylamino)ethyl methacrylate, 2-(diethylamino)ethyl methacrylate, glycidyl methacrylate, and t-butyl aminoethyl methacrylate. Similar monomers can be used to introduce ionic groups based on phosphorus and sulfur, as will be evident to the skilled artisan.

The pendant ionic moieties have the general formula —A(R$_1$)$_m$X, wherein A is selected from N, P, and S, R$_1$ are independently selected from alkyl or alkyl ether of 1–20 carbon atoms, phenyl or substituted phenyl, m is 3 when A is N or P, and m is 2 when A is S, and X is selected from halides and conjugate bases of organic acids. Preferably, A is nitrogen, and X is selected from the group consisting of carboxylates, sulfonates and phosphates.

After formation of the basic polymer structure, the cationic precursor can be brought into contact with conventional alkylation agents such as an alkyl halide, alkyl sulfonate, alkyl toluene sulfonate, trialkyl phosphate or aralkyl halide. Alkylation agents which have been found to be particularly satisfactory include methyl toluene sulfonate, dimethyl sulfate, and benzyl chloride.

The physical characteristics of the block copolymers of the present invention, including the molecular weight of the blocks and the presence of the ionic moieties on one of the blocks, can be confirmed by conventional analytical techniques, including differential scanning calorimetry, nuclear magnetic resonance, gas chromatography and infrared analysis. For example, the chemical composition of the blocks can be determined by proton nuclear magnetic resonance or infrared analysis, or by pyrolysis and gas chromatographic analysis. The block sizes in the copolymers can be determined by nuclear magnetic resonance, glass transition temperature, solubility or micelle formation as measured by quasi-elastic light scattering.

The resulting block copolymers exhibit excellent performance as dispersants. Accordingly, they can be used effectively as pigment dispersants in paint formulations and as oil additives. Pigment dispersions typically comprise pigment, solvent and dispersant, and can be prepared, for example, as described in Baker et al, U.S. Pat. No. 3,912,677, hereby incorporated by reference. While similar compounds have been so used in the past, the present copolymers are effective without the use of counter-ions such as ionized rosin acid or sulfonated aromatic hydrocarbon that have been previously found necessary for satisfactory dispersant performance. In addition, the uniform block character in the present compounds provides improved and more reliable dispersant performance.

In the following Examples, dispersant quality is measured by sand grinding a mixture of pigment, solvent and dispersant and determining what proportion of dispersant (if any) will give a uniform dispersion, appearing like stained glass at an optical magnification of 250x. In contrast, flocculated pigment has islands of color interspersed with areas of relatively clear solvent. The degree of dispersion is evaluated on an arbitrary scale of 1 to 4 as follows:

1—deflocculated dispersion in which pigment particles are uniformly separated and in which brownian motion of particles is evident.

2—slightly flocculated dispersion in which pigment particles are separated but immobile (no significant evidence of brownian motion).

3—flocculated dispersions in which pigment particles are loosely aggregated with some voids between aggregates.

4 — severely flocculated dispersions in which pigment particles are highly aggregated with large voids between aggregates.

The dispersants prepared in the Examples were evaluated with a variety of standard pigments and in solvents. The solvents used were methylisobutyl ketone (MIBK or M), toluene (T), xylenes (X), and acetone (A). The following standard pigments were used in the evaluation:

W505—phthalocyanine blue, red toned (monastral blue)

W552—phthaocyanine blue, flocculation resistant green shade, toner

W573—tetrachloro CPC blue; phthalocyanine blue toner, green shade, improved rheology W673—tetrachloro isoindolinone-irgazin yellow W805—monastral magenta-quinacridone type magenta toner W811—monastral red-quinacridone type red toner W853—organic red tone-quinacridone type-monastral transparent red B RT-233

In all Examples of the invention, the blocks of the copolymers containing the pendant ionic groups had a molecular weight of about from 200 to 10,000, and the blocks without the pendant ionic groups had a molecular weight of about from 500 to 100,000. The specific molecular weights can be determined by the skilled artisan from the data appearing in the particular Examples. In all Examples of the invention, an average of at least 2 pendant ionic groups were present in each block (a) of the copolymer prepared.

EXAMPLE 1

A reaction vessel was charged with 316 g tetrahydrofuran (THF), 0.5 mL xylenes, 4.1 g 1-methoxy-1-trimethylsiloxy-2-methylpropene ("initiator"), and 0.100 mL 1M tetrabutylammonium 3-chlorobenzoate in acetonitrile ("catalyst"). To prepare an A block free from pendant ionic groups, two feeds were begun simultaneously; 91.2 g of methyl methacrylate (MMA) was added in 20 minutes, and 0.350 mL catalyst in 3 ml THF was added over 2 hours. Twenty minutes after the addition of the MMA, 28.9 g of 2-N,N-dimethylaminoethyl methacrylate (DMEAMA) was added over 10 minutes for the preparation of a block containing pendant ionic groups. Twenty minutes after the addition of the DMAEMA, 91.9 g of MMA was added over 20 minutes. One hour after the second addition of MMA, 5 mL of methanol was added. The resin (251 g) was added to heptane (700 mL), the resulting solid was separated from the liquid, and the solid was washed with 700 mL of heptane and dried.

To quaternize the amine groups in the resulting block copolymer, a portion (30.69 g) of the copolymer was dissolved in THF (50.5 g) and benzyl chloride (3.0 g) was added. The resulting solution was refluxed for about 3 hours before the addition of 50.5 g isopropanol. Refluxing was continued for 5 more hours. The resulting resin showed a solids content of 22% and an tertiary amine content of 0.31 mM/gram, indicating substantially complete quaternization of the amine groups.

The copolymer was evaluated as a pigment dispersant, and exhibited a dispersion rating of 1 in MIBK (M1) for standard pigments W505, W552, W573, W673, W805, and W811. The copolymer was also evaluated with standard pigment W853 in MIBK, acetone and toluene to give ratings of M3, A1 and T3, respectively.

EXAMPLES 2-4 AND COMPARATIVE EXAMPLE A

In Comparative Example A, an ABA block copolymer was prepared having teriary pendant ionic groups attached to the B segment. The general composition of the block copolymer was MMA/BMA//DMAEMA//MMA/BMA in expected degrees of polymerization of 20/20//8//20/20. In Examples 2-4, this block copolymer was quaterized with three different quaternizing agents to form a composition of the present invention.

In Comparative Example A, a reaction vessel was charged with 1361 g THF, 21.5 g initiator, and 1.2 mL catalyst. A feed of 581.5 g of 41.3 wt % MMA in butyl methacrylate was added over 20 minutes, while an ice bath was used to maintain the reaction temperature between 20° and 35° C. Simultaneously, a 150 minute feed of 2.4 ml catalyst in 2.6 ml THF was started. Forty-five minutes after the end of the first monomer feed, a twenty minute feed of 173.3 g of 2-N,N-dimethylaminoethyl methacrylate was added. Forty minutes after the end of the second monomer feed, a twenty minute feed of 505.1 g of 41.3 wt % MMA in BMA was added. Ice cooling was again used. After about 16 hours, 40 ml of methanol was added.

The resulting block copolymer with tertiary pendant ionic groups was evaluated as a pigment dispersant, and the results summarized in Table I.

In Example 2, a reaction mixture of 513.2 g of the block copolymer of Comparative Example A, 126 g ethanol, and 25.0 g iodomethane was refluxed for three hours. The resulting block copolymer, with quaternized pendant ionic groups, was evaluated as a pigment dispersant, and the results summarized in Table I.

In Example 3, a reaction mixture of 500.2 g of the block copolymer of Comparative Example A, 125 g ethanol, and 30.3 g benzyl bromide was refluxed for sixteen hours. The resulting block copolymer, with quaternized pendant ionic groups, was evaluated as before, and the results summarized in Table I.

In Example 4, a reaction mixture of 200.2 g of the block copolymer of Comparative Example A, 50.0 g isopropanol, and 11.5 g methyl p-toluenesulfonate was refluxed for sixteen hours. The resulting block copolymer, with quaternized pendant ionic groups, was evaluated as before, and the results summarized in Table I.

TABLE I

| | DISPERSION RATINGS | | | |
|---|---|---|---|---|
| | | Example | | |
| Pigment | Control A | 2 | 3 | 4 |
| W552 | A1, X4, T4, M3 | A1, X1, T1, M1 | A1, M1, T1 X1 | — |
| W573 | A3 | M1, X3 | M1, X3 | 1, A3, T1 M1 |
| W673 | — | — | — | M1 |
| W805 | A1 | M1, X1 | M1, X1 | M1 |
| W811 | A4 | M1, X3 | M1, X3 | M1 |
| W853 | A1 | M1, X4 | M1, X4 | M1 |

EXAMPLE 5

An AB block copolymer was prepared having the general composition EHMA//DEAEMA 42//12. A reaction vessel was charged with 205 g toluene, 1.94 g initiator, and 0.111 mL catalyst. Simultaneously, a 1-hour feed of 0.222 mL catalyst in 5 mL toluene, and a 20 minute feed of 92.3 g 2-ethylhexyl methacrylate were started. After 40 minutes, 0.111 mL catalyst was added. After 3 hours more, 0.111 mL catalyst was added, and a ten-minute feed of 20.92 g 2-N,N-dimethylaminoethyl methacrylate was added. After 16 hours further, 5 mL of methanol was added. A portion (150 g) of the resulting resin was diluted with 37.61 g ethanol, 9.16 g benzyl bromide was added, and the resulting mixture was refluxed for 18 hours.

The copolymer was evaluated as a dispersant for standard pigments, and found to give an X4 rating for pigment W505, and X1 ratings for pigments W573, W805, W811, and W853.

EXAMPLES 6-7 COMPARATIVE EXAMPLES B-H

In Examples 6-7 and Comparative Examples B-H, comparisons were made between blocked and random copolymers of similar composition, and with varying degrees of quaternization of the pendant ionic moieties on each.

In the preparation of the random copolymer, a reaction vessel was charged with 127.2 g toluene, 2.26 g initiator, 74.5 g BMA, 52.6 g MMA, 29.7 g 2-N,N-diethylaminoethyl methacrylate, and 0.030 mL catalyst. Cooling was used to maintain the reaction temperature below 40° C. After 4 hours reaction, 5 mL methanol was added.

In the preparation of the blocked copolymer, a reaction vessel was charged with 130.3 g toluene, 0.5 ml xylenes, 2.27 g initiator, 76.4 g BMA, and 54.0 g MMA, and 0.030 mL catalyst. Cooling was used to keep the reaction temperature below 40° C. After 70 minutes reaction, simultaneous feeds of 29.4 g DEAEMA over 10 minutes and 0.20 mL catalyst in 5 mL toluene over 20 minutes were started. After a further hour of reaction, 5 mL methanol was added.

The resulting copolymers, having tertiary pendant ionic groups and representing Comparative Examples B and C, were evaluated as dispersants for standard pigment W552, and both exhibited ratings of A3, M4, and T4.

In Comparative Examples D-H and Examples 6 and 7, the block copolymers of Comparative Examples B and C were each diluted by combining 65 g resin and 19.5 g isopropanol. A 20 g portion of the resulting resin was quaternized using methyl p-toluenesulfonate, using 25 mole %, 50 mole %, 75 mole %, or 95 mole % of methyl p-toluenesulfonate, based on amine content. The resulting solutions were held at room temperature for 10 days. The resulting quaternized copolymers were evaluated as pigment dispersants and the results summarized below.

| | 25% QUATERNIZED | |
|---|---|---|
| Example | D | E |
| Pigment | (RANDOM) | (BLOCKED) |
| W573 | A3, M3, X3 | A3, M1, X2 |
| W805 | A4, M4, X4 | A4, M4, X2 |
| W811 | A1, M1, X2 | A1, M1, X1 |

-continued

| | | |
|---|---|---|
| W853 | A1, M1, X3 | A1, M1, X2 |

50% QUATERNIZED

| | Example | |
|---|---|---|
| | F | 6 |
| | (RANDOM) | (BLOCKED) |
| W573 | X3 | X1 |
| W805 | X4 | X1 |
| W811 | X3 | X1 |
| W853 | X3 | X1 |

75% QUATERNIZED

| | Example | |
|---|---|---|
| | G | 7 |
| | (RANDOM) | (BLOCKED) |
| W573 | X3 | X1 |
| W805 | X4 | X1 |
| W811 | X3 | X1 |
| W853 | X3 | X1 |

95% QUATERNIZED

| | Example | |
|---|---|---|
| | H | 8 |
| | (RANDOM) (A) | (BLOCKED) |
| W573 | A1, M2, X2 | A1, M1, X1 |
| W805 | A1, M3, X4 | A3, M4, X2 |
| W811 | A1, M1, X3 | A1, M1, X1 |
| W853 | A1, M1, X3 | A1, M1, X1 |

I claim:

1. A block copolymer consisting essentially of
   (a) about from 0.1 to 50%, by weight of the copolymer, of at least one block having a number average molecular weight of about from 200 to 10,000 and prepared from at least one monomer selected from compounds of the general formulas $CH_2=CHCO_2R$ and $CH_2=CCH_3CO_2R$, wherein R is alkyl or alkyl ether of 1-20 carbon atoms, the block further containing at least 2 pendant ionic moieties of the general formula $-A(R_1)_m X$, wherein A is selected from N, P, and S; $R_1$ are independently selected from alkyl or alkyl ether of 1-20 carbon atoms, phenyl or substituted phenyl, m is 3 when A is N or P, and m is 2 when A is S, and X is selected from halides and conjugate bases of organic acids, the pendant ionic moieties being derived from cationic units on the monomers used to prepare the block, or their precursors, and the backbone of the block being prepared from ethylenically unsaturated units, and
   (b) about from 99.9 to 50%, by weight of the copolymer, of at least one block having a number average molecular weight of about from 500 to 100,000 and prepared from monomers selected from compounds of the general formulas $CH_2=CHCO_2R$ and $CH_2=CCH_3CO_2R$, wherein R is alkyl or alkyl ether of 1-20 carbon atoms.

2. A block copolymer of claim 1 of the BAB configuration in which the copolymer contains at least two blocks as defined in (b).

3. A block copolymer of claim 1 wherein A in the pendant ionic groups is N.

4. A block copolymer of claim 3 wherein X is conjugate bases of organic acids which are selected from carboxylates, sulfonates and phosphates.

5. A block copolymer of claim 1 wherein the pendant ionic groups of block (a) are derived from dimethyl aminoethyl methacrylate.

6. A block copolymer of claim 1 wherein the pendant ionic groups of block (a) are derived from diethyl aminoethyl methacrylate.

7. A block copolymer of claim 1 wherein block (b) is polymerized from methyl methacrylate.

8. A block copolymer of claim 1 wherein block (b) is polymerized from butyl methacrylate.

9. A block copolymer of claim 1 wherein block (b) is polymerized from 2-ethylhexyl methacrylate.

10. A block copolymer of claim 9 wherein block (b) is polymerized from butyl methacrylate and 2-ethylhexyl methacrylate.

11. A block copolymer of claim 1 prepared by group transfer polymerization techniques.

12. A dispersion comprising pigment, organic liquid, and a block copolymer of claim 1.

* * * * *